(12) United States Patent
Ottenhues

(10) Patent No.: US 7,928,899 B2
(45) Date of Patent: Apr. 19, 2011

(54) DETECTION AND COMPENSATION OF TARGET LOSSES WHEN THERE IS A CHANNEL CHANGE

(75) Inventor: Thomas Ottenhues, Hörstel (DE)

(73) Assignee: Hella KGAA Hueck & Co., Lippstadt (DE)

( * ) Notice: Subject to any disclaimer, the term of this patent is extended or adjusted under 35 U.S.C. 154(b) by 87 days.

(21) Appl. No.: 12/374,299

(22) PCT Filed: Jul. 16, 2007

(86) PCT No.: PCT/EP2007/057306
§ 371 (c)(1),
(2), (4) Date: Jan. 16, 2009

(87) PCT Pub. No.: WO2008/012226
PCT Pub. Date: Jan. 31, 2008

(65) Prior Publication Data
US 2009/0184863 A1    Jul. 23, 2009

(30) Foreign Application Priority Data
Jul. 22, 2006 (DE) .......................... 10 2006 033 952

(51) Int. Cl.
*G01S 13/08* (2006.01)
(52) U.S. Cl. ........................... 342/118; 342/147

(58) Field of Classification Search .................. 342/118, 342/147
See application file for complete search history.

(56) References Cited

U.S. PATENT DOCUMENTS

| | | | |
|---|---|---|---|
| 4,034,374 A | 7/1977 | Kruger | |
| 5,210,586 A | 5/1993 | Grage et al. | |
| 2003/0011519 A1 | 1/2003 | Breglia | |
| 2003/0085835 A1* | 5/2003 | Matsui et al. | 342/70 |

FOREIGN PATENT DOCUMENTS

| | | |
|---|---|---|
| DE | 4028788 A1 | 3/1992 |
| EP | 0464263 A2 | 1/1992 |
| WO | 2006005696 | 1/2006 |

\* cited by examiner

*Primary Examiner* — Thomas H Tarcza
*Assistant Examiner* — Timothy A Brainard
(74) *Attorney, Agent, or Firm* — Robert C. Haldiman; Husch Blackwell LLP

(57) ABSTRACT

The present invention relates to a method of detecting and correcting the loss of a target lost by the distance sensor installation of a motor vehicle when a target object (4) moves from one detection channel of the distance sensor installation to an adjacent detection channel, wherein the method consists of determining the mean size of a weak detection band between the intensity peaks of two adjacent detection channels and computing the time a narrow target object (4), particularly if it is a single-channel target object, remains in this previously determined band.

21 Claims, 2 Drawing Sheets

DETECTION AND COMPENSATION OF TARGET LOSSES WHEN THERE IS A CHANNEL CHANGE

CROSS-REFERENCE TO RELATED APPLICATIONS

This application claims priority from international application PCT/EP2007/057306 filed 16 Jul. 2007 which claims priority to international application DE 10 2006 033 952.5 filed on 22 Jul. 2006.

PRIOR TECHNOLOGY

The present invention relates to a method of detecting and correcting the loss of targets lost by the distance sensor installation of a motor vehicle when a target object moves from one detection channel of the distance sensor installation to an adjacent detection channel.

Prior technology has presented so-called adaptive cruise control equipment (ACC equipment) for motor vehicles. This adaptive cruise control equipment uses a distance sensor installation to measure both the position and the speed of a vehicle ahead. The distance sensor installation can be based on radar or LIDAR sensors, for example. Speed and distance of the vehicle equipped with an adaptive cruise control installation are variably controlled by engine and/or brake actions with reference to the measured variables.

In the existing distance sensor installations, the intensity peaks of the detection channels of the distance sensor installation do not normally overlap. During operation, the distance sensor installation may thus be confronted with a situation in which comparatively weakly reflecting targets will not be detected between the intensity peaks of two adjacent channels, although they were detected at the intensity peak.

Previous experience shows that this effect is made stronger when the emitted signal is attenuated by the distance sensor installation being contaminated or by environmental influences such as heavy rain.

If the measured data of a target object to be detected by the distance sensor installation is not refreshed during the current measuring cycle, and if this nonrefreshment is due to an at first unknown reason, the distance sensor installation will normally reference the previous quality and life of previous results to predict the target object for a specified number of subsequent measuring cycles. Prior methods do not, however, correct the loss of targets caused by the energy being unevenly distributed within the range visible to the distance sensor installation. One of the consequences is that, whereas fairly narrow, single-channel targets such as a motorcycle ahead will be recognized at the target's center, they will be discarded in the band between two adjacent detection channels of the distance sensor installation and need to be recognized again in every detection channel.

This behavior may result in a loss of the relevant target object which the driver of the motor vehicle will not be able to understand.

This is where the current invention comes in.

The task of the present invention is to provide a method of detecting and correcting the loss of a target lost by a distance sensor installation of a motor vehicle when the target object moves from one detection channel of the distance sensor installation to an adjacent detection channel such that said method is able to detect comparatively narrow, mainly single-channel target objects without losing the target.

ADVANTAGES OF THE INVENTION

The invention achieves this aim by a method defined by the elements described herein, and beneficial variants of the invention.

The inventive method is marked by determining the mean size of a weak detection band between the intensity peaks of two adjacent detection channels and computing the time a narrow target object, particularly if it is a single-channel target object, remains in this previously determined weak detection band. Computing this time allows the time to be determined at which the target object will enter the adjacent detection channel and the presence of a target object to be predicted for the time when the target object moves from a channel i to an adjacent channel i+1 (or i−1) such that a possible loss of target is prevented in a simple and efficient manner.

Specifically, in vehicles driving straight ahead, the inventive solution can rely on comparatively narrow and preferably stationary target objects, such as roadway delineators, by measuring the distance between the target object disappearing from a detection channel i of the distance sensor installation and the reappearance of the target object in the adjacent detection channel i+1 (or i−1). Applying geometrical relationships provides a simple means of specifically determining the weak detection band between the two adjacent channels i, i+1 (or i, i−1).

The approach presented herein allows a dynamic adaptation to the signal pattern of the distance sensor installation to stabilize comparatively narrow targets which potentially escape detection when moving from one channel to the next and to have said targets continuously available for further processing, particularly for forward motion control.

A preferred embodiment suggests determining a lateral width b of the weak detection band by applying the following relation $$b = \tan(\alpha_i) * s,$$

where $\alpha_i$ is the transition angle between channel i and its adjacent channel, and s is the distance traveled by the motor vehicle before the target object returns into a sufficiently sensitive range of the adjacent channel.

An advantageous embodiment provides an option of determining the distance s by integrating the time into the speed v of the motor vehicle. Determining the distance s is thus possible with comparatively simple means.

In a preferred embodiment, a mean aperture angle w of the weak detection band between the, adjacent detection channels is determined An advantageous embodiment may determine the mean aperture angle w of the weak detection band by the following relation:

$$w = \arcsin(b/d)$$

where d is the mean radial distance between the disappearance of the target object and its reappearance in the adjacent detection channel. Thus, variable d is a virtual distance to the target when the target moves from one detection channel to an adjacent detection channel derived from the mean distance to the target as the target object disappears from one channel and reappears in the adjacent channels.

In order to improve the accuracy of the method, a particularly advantageous embodiment suggests that the mean aperture angle w of the weak detection band is determined by measuring a variety of different channels and/or target objects. Computations can be simplified by assuming that the energy is evenly distributed among the different detection channels.

Knowing the mean aperture angle w allows a preferred embodiment to invert the above method, as it were, to compute the distance between the point at which a reflection disappears from one detection channel i and the point at which the reflection reappears in an adjacent detection channel i+1 (or i−1) of the distance sensor installation.

An advantageous embodiment can determine the width s' of the weak detection band by applying the following relation:

$$s'=d'\times\sin(w)/\tan(\alpha_i)$$

where d' is the last target object distance measured and $\alpha_i$ is the angle between the previous position and the expected channel transition ($\alpha_i$ here being substantially equivalent to the transition angle between channel I and its adjacent channel recited in paragraph 13 above.)

Moreover, a preferred embodiment provides an option of measuring the relative speed $v_{rel}$, of the motor vehicle with reference to the target object.

A particularly preferred embodiment may apply the following equation:

$$t=s'/v_{rel}$$

to compute the time t that the target object stays within the weak detection band. This time t can be used to compute the number of measuring cycles which will not provide the distance sensor installation with refreshed target object distance data and must therefore be predicted by means of an analyzer.

The method described herein can also be applied to stabilize target objects of roadside constructions, for example, and make them available for algorithms used to anticipate curves or compute lane widths.

It has been possible to show that the method presented herein may also support sustained target tracking under bad external conditions such as rain, a dirty sensor installation or a dirty target vehicle, since these objects, although reflecting a lot less energy, can often still be detected as single-channel objects which the approach described herein is able to stabilize.

DRAWINGS

The description of a preferred embodiment below illustrates further features and benefits of the current invention with reference to the attached figures. The following is shown.

EXPLANATION OF EMBODIMENT

Figure 1:
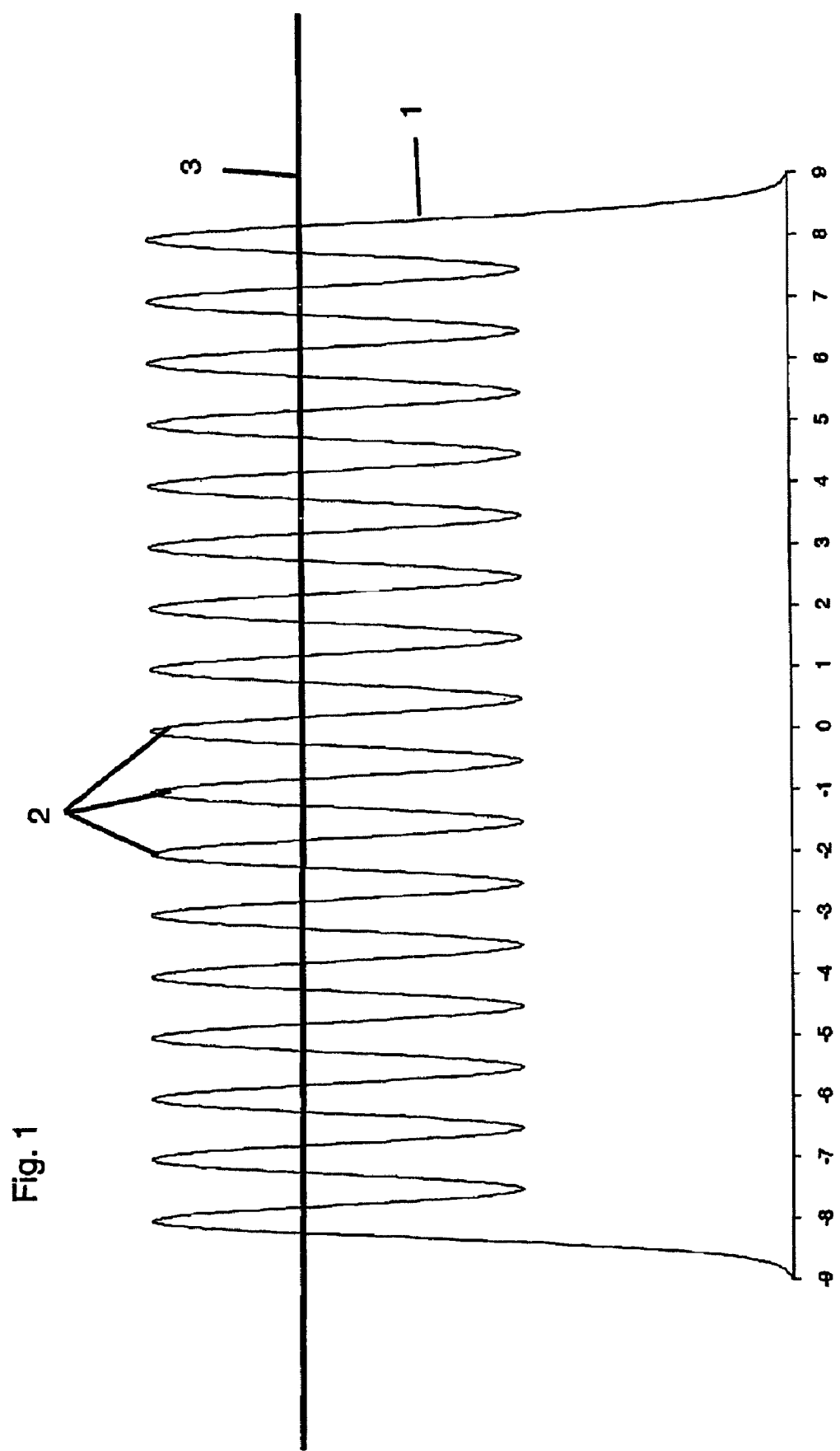
FIG. 1 is a much simplified illustration of how the energy of the detection signals is distributed in a multi-channel receiver device of a distance sensor installation for motor vehicles.

FIG. 1 is a simplified illustration of how the energy of the detection signals is distributed 1 in a multi-channel receiver device of a distance sensor installation for motor vehicles. Obviously, the energy is not homogenously distributed across each of the channels. There are sections (normally in the middle of a channel) where a target object reflecting comparatively weak signals can still be detected by a suitably rated signal processing circuitry, whereas the same target object cannot be detected in weak detection bands (usually at the edge of the channel) of the same channel. FIG. 1 shows a variety of energy peaks 2 in each of the channels. The horizontal line through the diagram is indicative of an energy threshold 3 below which a weakly reflecting target object will not be detected.

Figure 2:
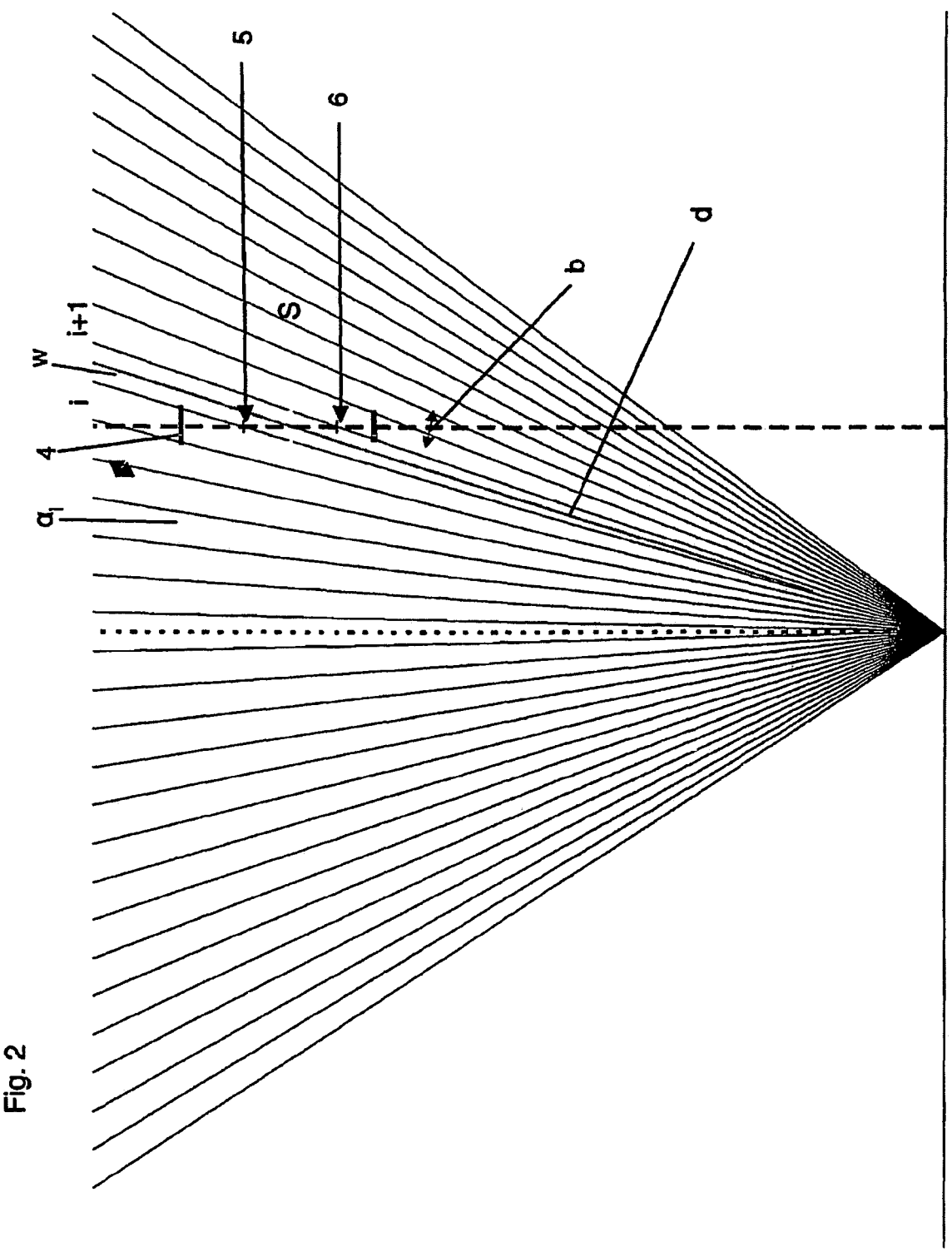
FIG. 2 is a schematic diagram illustrating the basic principle of an inventive method of detecting and correcting the loss of target lost by a distance sensor installation for motor vehicles.

FIG. 2 schematically illustrates how a distance sensor installation for motor vehicles suited for implementing the method explained below is capable of fanning out the presentation of a detection band (ray). Examples of the requisite hardware arrangements include an emitter device and a receiver device which may be revolving like in a scanner, multiple mainly parallel emitter devices and a receiver device, or LIDAR-based distance sensor installations comprising several parallel emitter devices and receiver devices (for example 16×1°). Rays are generally emitted sequentially.

In the case of a stationary, comparatively narrow, single-channel target object 4 with a certain lateral width, the weak detection band for this target object 4 can be computed while a motor vehicle is driving straight ahead, as described below with reference to FIG. 2.

When the single-channel target object 4 leaves a channel i via an exit point 5 on its right-hand channel side, the distance s traveled by the motor vehicle until the target object 4 emerges through an entry point 6 to return into a sufficiently sensitive band of an adjacent channel i+1 (or i−1) can be determined by integrating the time into the speed v of the motor vehicle. The lateral width b of the weak detection band closely approximates as:

$$b/2=\tan(\alpha_i)*s/2,$$

where $\alpha_i$ is the transition angle between channel i and its adjacent channel i+1.

Taking this result as a basis, the aperture angle w of the weak detection band (w here being substantially equivalent to the mean aperture angle w of the weak detection band between the, adjacent detection channels recited in paragraph 15 above.) can be sufficiently approximated using the following equation:

$$b=d\times\sin(w)$$

where d is the mean radial distance between the disappearance of the target object (4) and its reappearance in the adjacent detection channel. In other words, variable d is a virtual distance to the target when the target moves from one detection channel to the next derived from the mean distance to the target as the target object 4 disappears from one channel and reappears in the adjacent channels i and i+1.

Aperture angle w of the weak detection band results as follows:

$$w=\arcsin(b/d)$$

The aperture angle w of the weak detection band can thus be determined by means of a simple geometric relation.

It should be expressly noted at this point that the above explanation does, of course, apply to channels changed towards the left-hand side of the distance sensor installation also.

Repeatedly measuring different channels i and target objects 4 closely approximates the aperture angle w of the weak detection band.

Once the aperture angle w is known, it is possible to fairly reliably predict how long a comparatively narrow single-channel object 4 will presumably remain in the weak detection band of channel i of the receiver device of the distance sensor installation.

This is supported by computing the length s' of the weak detection band as follows:

$$s' = d' \times \sin(w)/\tan(\alpha_i),$$

where d' is assumed to be the last distance to the target object 4 and $\alpha_i$ is the angle between the previous position and the expected channel transition.

Adding the relative speed $V_{rel}$ of the motor vehicle vs. the target object 4, which is computed in a simple manner, the time that the target object 4 remains in the weak detection band computes as follows:

$$t = s'/V_{rel}$$

Using the cycle time to break down this value into discrete values will yield the number of measurements required to predict the place of target object 4. To conclude, the method described herein provides a simple means of detecting and correcting a possible loss of target, which may be encountered when operating the distance sensor installation.

The invention claimed is:

1. A method of detecting and correcting the loss of targets lost by a distance sensor installation of a motor vehicle when a target object moves from one detection channel of the distance sensor installation to an adjacent detection channel, comprised of the following steps:
   receiving a signal from a distance sensor installation;
   determining a mean width of a weak detection band as located between two intensity peaks of two adjacent detection channels;
   computing a time that the target object remains in said weak detection band.

2. The method according to claim 1, wherein a lateral width b of the weak detection band is determined according to the following equation $$b = \tan(\alpha_i) * s,$$

where $\alpha_i$ is the transition angle between channel i and its adjacent channel, and s is the distance traveled by the motor vehicle before the target object returns into a sufficiently sensitive range of the adjacent channel.

3. The method according to claim 2, wherein a mean aperture angle w of the weak detection band is determined between the adjacent detection channels.

4. The method according to claim 3, wherein the mean aperture angle of the weak detection band is determined by means of the following equation:

$$w = \arcsin(b/d)$$

where d is the mean radial distance between the disappearance of the target object and its reappearance in the adjacent detection channel.

5. The method according to claim 3, wherein that the mean aperture angle w of the weak detection band is determined by measuring a variety of different channels i and/or target objects.

6. The method according to claim 3, wherein a length s' of the weak detection band is determined by means of the following equation $$s' = d' \times \sin(w)/\tan(\alpha_i)$$

where d' is the last distance measured to the target object and $\alpha_i$ is the angle between the previous position and an expected channel transition.

7. The method according to claim 1, wherein a distance s is determined by integrating the time into the speed v of the motor vehicle.

8. The method of claim 1, wherein a relative speed $v_{rel}$ of the motor vehicle is measured with reference to the target object.

9. The method of claim 8, wherein the following equation is applied:

$$t = s'/v_{rel}$$

where s' is a length of the weak detection band, to compute the time t that the target object stays within the weak detection band.

10. The method of claim 1 further comprising the target being narrow.

11. The method of claim 1 further comprising the target being a single channel target.

12. A method of detecting and correcting the loss of targets lost by a distance sensor installation of a motor vehicle when a target object moves from one detection channel of the distance sensor installation to an adjacent detection channel, comprised of the following steps:
   receiving a signal from a distance sensor installation;
   determining a mean width of a weak detection band as located between two intensity peaks of two adjacent detection channels;
   computing a time that the target object remains in said weak detection band;
   calculating a distance to the target object using said width determination and said time computation, said calculated distance correcting for the loss of the target to direct sensing.

13. A distance sensor in a distance sensor installation of a motor vehicle, said distance sensor determining a distance to a target object lost when the target object moves from one detection channel of the distance sensor installation to an adjacent detection channel, said distance sensor comprising:
   a signal processing circuit, said signal processing circuit being configured to determine a mean width of a weak detection band as located between two intensity peaks of two adjacent detection channels;
   said signal processing circuit being further configured to compute a time that the target object remains in said weak detection band; and
   said signal processing circuit being further configured to calculate a distance to the target object using said width determination and said time computation.

14. The sensor of claim 13, wherein a lateral width b of the weak detection band is determined according to the following equation $$b = \tan(\alpha_i) * s,$$

where $\alpha_i$ is the transition angle between channel i and its adjacent channel, and s is the distance traveled by the motor vehicle before the target object returns into a sufficiently sensitive range of the adjacent channel.

15. The sensor of claim 14, wherein a mean aperture angle w of the weak detection band is determined between the adjacent detection channels.

16. The sensor of claim 15, wherein the mean aperture angle of the weak detection band is determined by means of the following equation:

$$w = \arcsin(b/d)$$

where d is the mean radial distance between the disappearance of the target object and its reappearance in the adjacent detection channel.

17. The sensor of claim 13, wherein a distance s is determined by integrating the time into the speed v of the motor vehicle.

18. The sensor of claim 13, wherein the mean aperture angle w of the weak detection band is determined by measuring a variety of different channels i and/or target objects.

19. The sensor of claim 16, wherein a length s' of the weak detection band is determined by means of the following equation $$s'=d'\times\sin(w)/\tan(\alpha_i)$$

where d' is the last distance measured to the target object and $\alpha_i$ is the angle between the previous position and an expected channel transition.

20. The sensor of claim 13, wherein a relative speed $v_{rel}$, of the motor vehicle is measured with reference to the target object.

21. The sensor of claim 20, wherein the following equation is applied:

$$t=s'/v_{rel}$$

where s' is a length of the weak detection band, to compute the time t that the target object stays within the weak detection band.

* * * * *